United States Patent
Sicard

(10) Patent No.: US 11,068,144 B2
(45) Date of Patent: Jul. 20, 2021

(54) DIAMOND SHAPED DIGITIAL COLOR SELECTION INTERFACE

(71) Applicant: LEDVANCE LLC, Wilmington, MA (US)

(72) Inventor: Zachary Sicard, Gloucester, MA (US)

(73) Assignee: LEDVANCE LLC, Wilmington, MA (US)

(*) Notice: Subject to any disclaimer, the term of this patent is extended or adjusted under 35 U.S.C. 154(b) by 73 days.

(21) Appl. No.: 16/040,633

(22) Filed: Jul. 20, 2018

(65) Prior Publication Data
US 2020/0026420 A1    Jan. 23, 2020

(51) Int. Cl.
| G06F 3/0482 | (2013.01) |
| G06F 3/0484 | (2013.01) |
| G06F 3/0481 | (2013.01) |
| G06F 3/0488 | (2013.01) |
| H05B 45/10 | (2020.01) |
| H05B 45/20 | (2020.01) |

(52) U.S. Cl.
CPC ........ *G06F 3/04847* (2013.01); *G06F 3/0482* (2013.01); *G06F 3/04817* (2013.01); *G06F 3/04886* (2013.01); *H05B 45/10* (2020.01); *H05B 45/20* (2020.01)

(58) Field of Classification Search
CPC .................................................... G06F 3/0482
USPC ...................................................... 715/771
See application file for complete search history.

(56) References Cited

U.S. PATENT DOCUMENTS

| 8,494,660 B2 * | 7/2013 | Engelen ............... H05B 47/155 700/19 |
| 2004/0085361 A1 * | 5/2004 | Kessler ............... G06F 3/04842 715/776 |
| 2007/0035513 A1 * | 2/2007 | Sherrard ................. H04M 1/27 345/157 |
| 2008/0215981 A1 * | 9/2008 | York ....................... A63F 13/00 715/720 |
| 2008/0316730 A1 * | 12/2008 | Diederiks ............ H05B 47/175 362/85 |
| 2009/0210815 A1 * | 8/2009 | Cheng ................... G06F 3/0236 715/773 |

(Continued)

OTHER PUBLICATIONS

Tech with Brett, "LIFX Setup and Tutorial | Fix Not Connecting Issues", published Jul. 12, 2017, available at <<https://www.youtube.com/watch?v=3HhrcpRyZek>>, 24 pages (Year: 2017).*

(Continued)

*Primary Examiner* — Daniel Rodriguez
(74) *Attorney, Agent, or Firm* — Tutunjian & Bitetto PC

(57) ABSTRACT

A method for selecting colors to be projected from a lamp is provided. In one embodiment, the method includes pairing a lamp with a graphic user interface having a diamond shaped perimeter grid of selectable light color settings surrounding a selectable dimming setting. The diamond shaped perimeter grid including four color based segments, wherein each of the four color based segments provides a different family of colors. The user of the graphic user interface selects the selectable light color setting from the graphic user interface, wherein a device including the graphic user interface transmits a signal to the lamp to emit light having a color that is consistent with the selectable light color setting that has been selected by the user.

12 Claims, 8 Drawing Sheets

(56) References Cited

U.S. PATENT DOCUMENTS

| | | | | |
|---|---|---|---|---|
| 2013/0050088 | A1* | 2/2013 | Smith | G07F 19/205 |
| | | | | 345/168 |
| 2013/0173445 | A1* | 7/2013 | Johnson | G06F 3/0482 |
| | | | | 705/37 |
| 2016/0103562 | A1* | 4/2016 | Bombolowsky | G06F 3/0481 |
| | | | | 715/817 |
| 2017/0185278 | A1* | 6/2017 | Sundermeyer | G08B 13/19682 |
| 2017/0235471 | A1* | 8/2017 | Scholer | G01F 1/666 |
| | | | | 715/772 |
| 2017/0357425 | A1* | 12/2017 | Smith | G05B 15/02 |
| 2017/0359189 | A1* | 12/2017 | Smith | G06F 3/0482 |
| 2018/0322661 | A1* | 11/2018 | Shugrina | G06T 11/001 |

OTHER PUBLICATIONS

Fabion Affolter, "0.59: Order pizza, Entity Picker, Color Wheel", published Dec. 3, 2017, available at <<https://www.home-assistant.io/blog/2017/12/03/release-59/>>, 11 pages (Year: 2017).*

Triplus Tutorials "Ikea Tradfri smart lighting RGB LED in home assistant", available on Feb. 2, 2018, available at <<https://www.youtube.com/watch?v=m998OCptX7g&feature=emb_logo>>, 11 pages (Year: 2018).*

Hueswitcher.com, "Hue Switcher Instructions", available at <<https://www.hueswitcher.com/instructions.html>>. archived on Sep. 14, 2017 at wayback machine—https://archive.org/web, 6 pages (Year: 2017).*

* cited by examiner

US 11,068,144 B2

DIAMOND SHAPED DIGITIAL COLOR SELECTION INTERFACE

TECHNICAL FIELD

The present disclosure generally relates to interfaces with lighting, and more particularly to methods of controlling color, color temperature or dimming levels of lamps through lighting interfaces.

BACKGROUND

Home and professional environments can contain many controllable lighting devices for creation of ambient, atmosphere, accent or task lighting. These controllable lighting devices are often connected and controlled via a network, which can be wired or wireless. These lighting devices can be controlled individually or in groups via a user interface of a lighting control.

SUMMARY

In one aspect, a method for selecting colors to be projected from a lamp is provided. In one embodiment, the method includes pairing a lamp with a graphic user interface having a diamond shaped perimeter grid of selectable light color settings surrounding a selectable dimming setting. The user of the graphic user interface selects the selectable light color setting from the graphic user interface, wherein a device including the graphic user interface transmits a signal to the lamp to emit light having a color that is consistent with the selectable light color setting that has been selected by the user.

In another aspect, a controller is provided for selecting colors to be projected from a lamp. The controller may include a graphic user interface that is displayed on a device screen. The controller can also include a communication module that provides that the controller is in communication with at least one lamp. The controller may include a light setting application that provides a lamp light emission setting interface that includes a diamond shaped perimeter grid of selectable light color settings surrounding a selectable dimming setting for display on the device screen, wherein activation of one of the selectable light color settings or the selectable dimming setting by a selector of the graphic use interface by a user of the controller sends a signal via the communication module to the at least one lamp to emit light having a color that is consistent with the selectable light color setting that has been selected by the user.

In yet another aspect, a computer program product is provided that provides a lamp light emission setting interface that includes diamond shaped perimeter grid of selectable light color settings. The computer product may include a non-transitory computer readable storage medium having a computer readable program for providing the method of controlling light color selection of light being emitted from a lamp. The computer readable program when executed on a computer causes the computer to perform the steps of pairing a lamp with a graphic user interface having a diamond shaped perimeter grid of selectable light color settings surrounding a selectable dimming setting. The computer readable program when executed on a computer allows the user of the graphic user interface to select a selectable light color setting from the graphic user interface. The computer readable program when executed on a computer further provides that the device including the graphic user interface transmits a signal to the lamp to emit light having a color that is consistent with the selectable light color setting that has been selected by the user.

These and other features and advantages will become apparent from the following detailed description of illustrative embodiments thereof, which is to be read in connection with the accompanying drawings.

BRIEF DESCRIPTION OF THE DRAWINGS

The following description will provide details of embodiments with reference to the following figures wherein.

DETAILED DESCRIPTION

Figure 1:
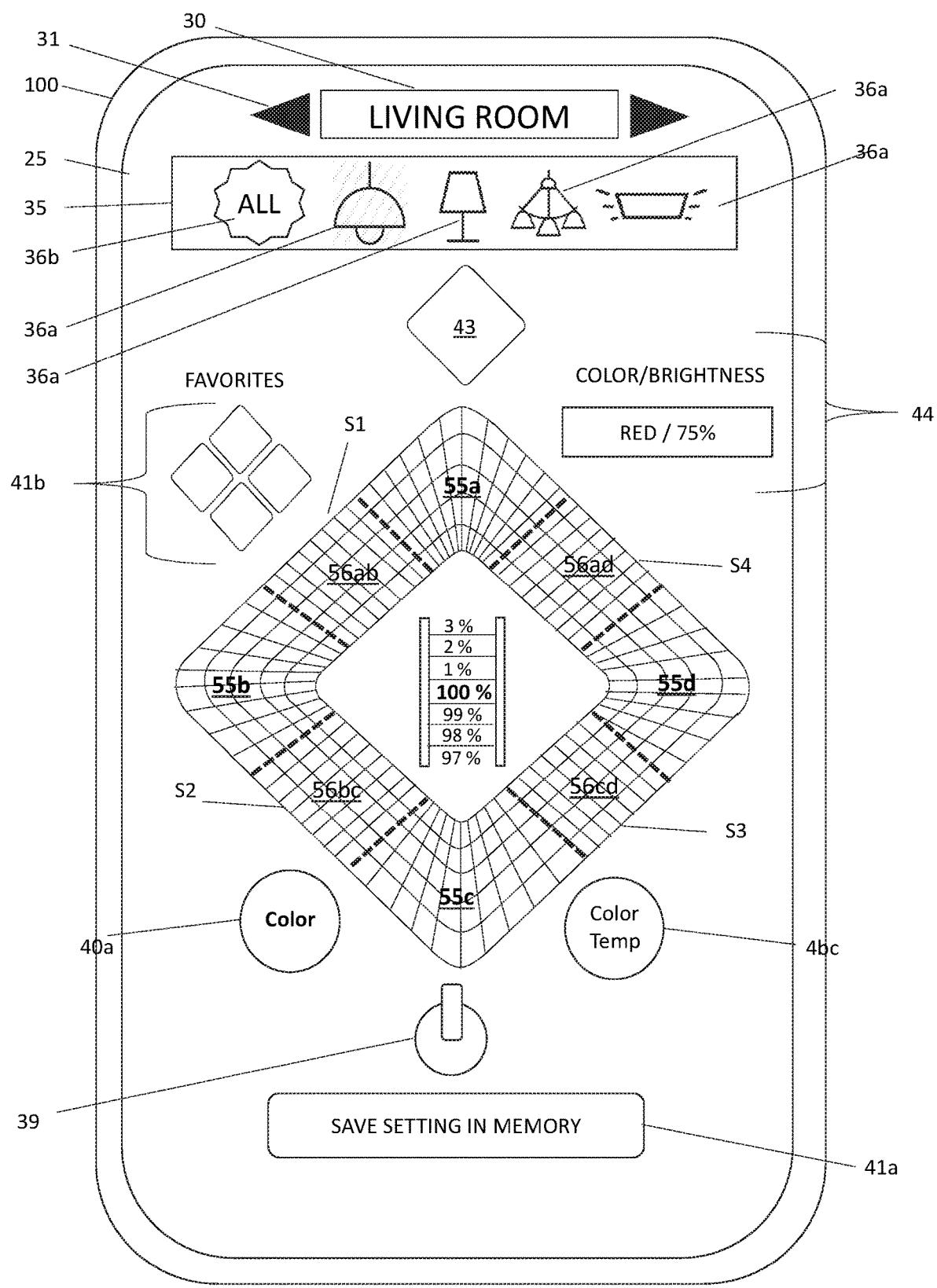
FIG. 1 is an illustration of a screen shot of a graphic user interface on a mobile device for adjusting light emitted by a lamp, in which the graphic user interface includes a diamond shaped perimeter grid of selectable light color settings surrounding a selectable dimming setting, wherein the selectable light color settings are for adjusting color of the light emitted by the lamp, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the methods, systems and computer program products that are described herein can control lighting parameters, such as color and intensity/dimming, for light being projected by a luminaire, e.g., lamp. The methods, systems and computer program products may be employed using a mobile computing device, such as a cellular phone, e.g., smart phone, or tablet device, which include a device screen for displaying the color selection scheme that includes diamond shaped perimeter grid of selectable light color settings surrounding a selectable dimming setting.

The majority of color pickers used in the smart home lighting industry use a circular design for their digital applications. In the methods, systems, and computer program products of the present disclosure, the color selection scheme, i.e., color picker, which includes a diamond shaped perimeter grid of selectable light color settings surrounding a selectable dimming setting is employed on an interactive device, e.g., a smartphone, that can be used to communicate with a lamp having selectable color light emission characteristics. Using the color selection scheme, the interactive device can send signals to the lamp to adjust the hue and saturation values of the color of light being emitted by the lamp. It has been determined that in color selection schemes including a grid selectable having a circular type geometry have disadvantages with difficulties in the ability of the user to accurately select the color that the user wishes to select. It has been determined that the circular shape although allowing a user to navigate around a broad range of colors does not provide for a precise means of selecting via touch screen interface an exact color, e.g., an exact red color, an exact blue color, an exact green color and/or exact green color; because there are not straight lines in a circle, such as grids of color selectable setting having a circular geometry. Selecting or adjusting the color or dimming of light projected by lamp executed using a touch screen type pointing device with color selection schemes including a grid selectable having a circular type geometry is also not capable of providing the fine adjustments needed for adjusting and selecting light settings considering the voluminous combinations of settings for color, intensity/dimming and/or color temperature.

It has further been determined that this difficulty in precision is amplified when employing the relatively large contact surface of a human fingertip on a relatively small surface of a touch screen of a mobile computing device, such as a smart phone. Fine adjustment is difficult due to the small scale of the image from which the color settings may be selected on the touch screen. The screen resolution and sensitivity of the touch screen are other factors that can further degrade the ability of a user to select lighting settings for fine adjustments.

In some embodiments, the methods, systems and computer program products that are described herein can provide for high precision in fine tuning and/or selection of light settings by controlling light setting selections using a color selection scheme, i.e., color picker, which includes a diamond shaped perimeter grid of selectable light color settings surrounding a selectable dimming setting. The diamond shaped perimeter grid of selectable light color settings provides for four separate quadrants, e.g., red quadrant, blue quadrant, green quadrant or yellow quadrant, with potentially hundreds of hues and saturation values within the quadrants. In some embodiments, because each of the quadrants includes selectable light color settings in substantially linear columns and rows, the user can navigate different color settings by linear motions, which allows the user to more clearly choose different colors, e.g., the correct hue and saturation of red color selected from the red quadrant, the correct color hue and saturation of blue color from the blue quadrant, the correct color hue and saturation of green color from the green quadrant, and the correct color hue and saturation of yellow color from the yellow quadrant. The geometry of the present color selection scheme, i.e., diamond shaped perimeter of selectable light color settings, lends itself to smoother interactions and choices between coordinates, i.e., selectable color settings. The design can allow the user to select via touch interface with near perfect precision color settings, e.g., red, blue, green and yellow coordinates, by touch interface landing precisely on the user selected color settings. The methods, systems and computer program products that are provided herein are now describe with more detail with reference to FIGS. 1-8.

Figure 2:
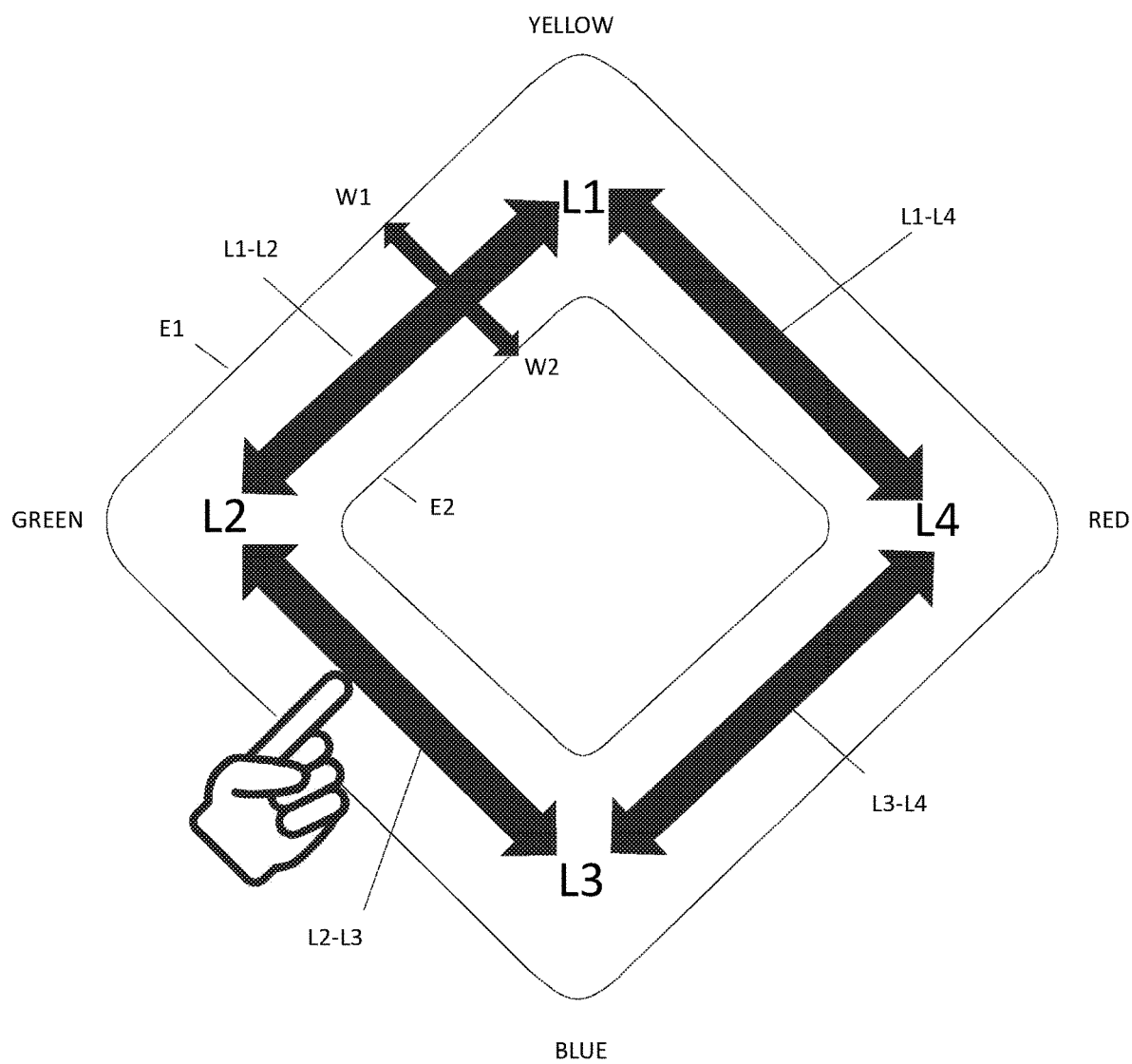
FIG. 2 is an illustration depicting how a touch type interface can select colors from the diamond shaped perimeter grid of selectable light color settings that is depicted in FIG. 1, in accordance with one embodiment of the present disclosure.
Figure 3:
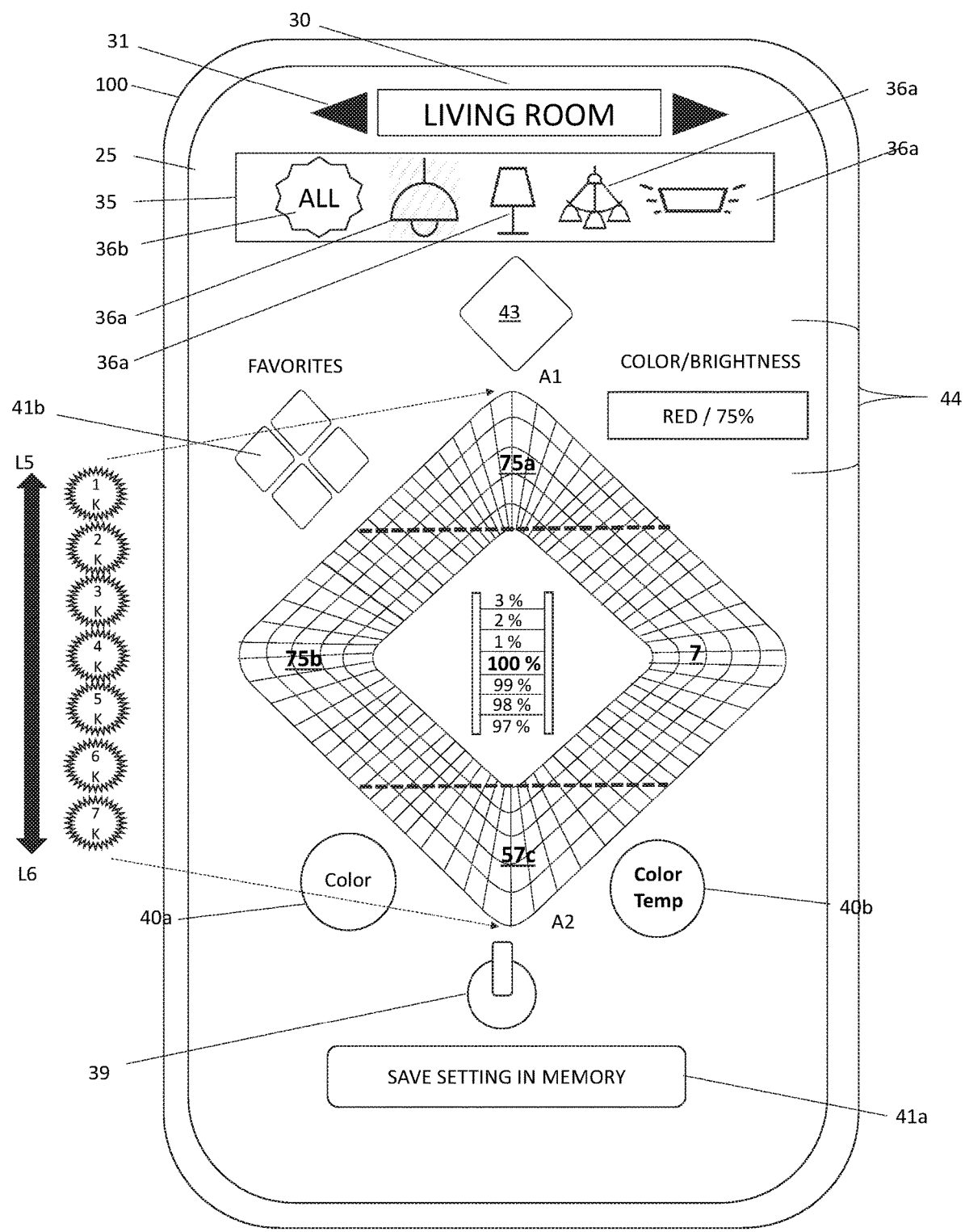
FIG. 3 is an illustration of a screen shot of a graphic user interface on a mobile device for adjusting light emitted by a lamp, in which the graphic user interface includes a diamond shaped perimeter grid of selectable light color settings surrounding a selectable dimming setting, wherein the selectable light color settings are for adjusting color temperature of the light emitted by the lamp, in accordance with one embodiment of the present disclosure.

FIGS. 1-3 illustrate screen shots of a graphic user interface on a mobile device 100 that includes a color/color temperature selection scheme that includes diamond shaped perimeter grid 50 of selectable light color/color temperature settings 51 surrounding a selectable dimming setting 52, in accordance with one embodiment of the present disclosure. In some embodiments, whether the light color/color temperature settings 51 correspond to a light color, as depicted in FIG. 1, or when the light color/color temperature settings 51 correspond to a light color temperature, as depicted in FIG. 3, can be provided by activating either the light color or color temperature settings from the selectable color button 40*a* or the selectable color temperature button 40*b*. The selectable color button 40*a* and the selectable color temperature button 40*b* are icons that are depicted on the graphic user interface that can be activated by touch interface, i.e., touch selection via a touch screen. Referring to FIG. 1, activation of the selectable color button 40*a* provides that the light color/color temperature settings 51 of the diamond shaped perimeter grid 50 correlates to selecting light colors to be emitted from the lamp being controlled by the color/color temperature selection scheme that includes diamond shaped perimeter grid 50. Referring to FIG. 3, activation of the selectable color temperature button 40*b* provides that the light color/color temperature settings 51 of the diamond shaped perimeter grid 50 correlates to selecting light color temperatures to be emitted from the lamp being controlled by the color/color temperature selection scheme that includes diamond shaped perimeter grid 50.

The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, systems and computer program products described herein can include red, orange, yellow, green, blue, indigo, violet and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

The "color temperature" of a light source is the temperature of an ideal black-body radiator that radiates light of a color comparable to that of the light source. Color temperature is expressed in kelvin, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature.

Referring to FIG. 1, when the user has activated the diamond shaped perimeter grid 50 so that the light color/color temperature settings 51 select specific light colors to be emitted from the lamp, the diamond shaped perimeter grid 50 may be segmented to include four quadrants 55a, 55b, 55c, 55d positioned at each apex, i.e., corners, peak and base, of the diamond shaped geometry, in which each quadrant 55a, 55b, 55c, 55d corresponds to a specific primary color. The boundaries of the quadrants are identified by dashed lines.

Referring to FIG. 1, in one embodiment, the perimeter grid 50 of the color selection scheme includes a diamond shaped geometry. A diamond is a quadrilateral, a 2-dimensional flat figure that has four closed, straight sides S1, S2, S3, S4. The opposing sidewalk of the diamond shaped geometry can be parallel to one another. Therefore, in some instances, the diamond may be a parallelogram.

In one embodiment, the first quadrant 55a includes light selectable settings 51 for a family of light colors that are primarily yellow, the second quadrant 55b includes light selectable settings 51 for a family of colors that are primarily green, the third quadrant 55c includes light selectable settings 51 for a family of colors that are primarily blue, and the fourth quadrant 55d of light selectable settings 51 is for a family of colors that are primarily red. The quadrants 55a, 55b, 55c, 55d of families of colors, i.e., primary colors, e.g., yellow, green, blue and red, are present at the apexes of the perimeter grid 50 of the color selection scheme. However, between the quadrants 55a, 55b, 55c, 55d of the primary colors, are mixed color quadrants 56ab, 56bc, 56cd, 56ac. By mixed it is meant that the mixed color quadrants are different hues of color provided by only the primary colors of the primary color quadrants 55a, 55b, 55c, 55d that border the mixed color quadrants 56a, 56b. Hue is one of the properties (called color appearance parameters) of a color, defined as the degree to which a stimulus can be described as similar to or different from stimuli that are described as red, green, blue, and yellow. Usually, colors with the same hue are distinguished with adjectives referring to their lightness or colorfulness, such as with "light blue", "pastel blue", "vivid blue". Exceptions include brown, which is a dark orange. Hue refers to a pure pigment one without tint or shade, i.e., without added white or black pigment, respectively.

Each of the mixed color quadrants 56ab, 56bc, 56cd, 56ac are positioned between two of the quadrants 55a, 55b, 55c, 55d of primary colors, i.e., yellow, green, blue and red, that are present at the apexes of the diamond shaped perimeters. Therefore, each of the mixed color quadrants 56ab, 56bc, 56cd, 56ac are present in the portions of the diamond shaped perimeter having the linear sidewalls, i.e., S1, S2, S3, and S4.

Each of the mixed color quadrants 56ab, 56bc, 56cd, 56ac are hues of the combination of the primary colors from the quadrants 55a, 55b, 55c, 55d present at the apexes of the diamond shaped perimeter 50. For example, the quadrant identified by reference number 56ab at the sidewall of the diamond shaped perimeter 50 identified by reference number S1 is a mixed color quadrant 56ab in which the hue of the colors is a mixture of yellow and green, which is the primary colors of quadrants 55a, 55b, i.e, the colors of the quadrants bordering the mixed color quadrant 56ab. For example, the quadrant identified by reference number 56bc at the sidewall of the diamond shaped perimeter 50 identified by reference number S2 is a mixed color quadrant 56bc in which the hue of the colors is a mixture of green and blue, which is the primary colors of quadrants 55b, 55c, i.e., the colors of the quadrants bordering the mixed color quadrant 56bc. For example, the quadrant identified by reference number 56cd at the sidewall of the diamond shaped perimeter 50 identified by reference number S3 is a mixed color quadrant 56cd in which the hue of the colors is a mixture of blue and red, which is the primary colors of quadrants 55b, 55c, i.e, the colors of the quadrants bordering the mixed color quadrant 56cd. For example, the quadrant identified by reference number 56ad at the sidewall of the diamond shaped perimeter 50 identified by reference number S4 is a mixed color quadrant 56ad in which the hue of the colors is a mixture of yellow and red, which is the primary colors of quadrants 55a, 55d, i.e., the colors of the quadrants bordering the mixed color quadrant 56ad.

In the mixed color quadrants 56ab, 56bc, 56cd, 56ac, the closer the light selectable settings 51 to the bordering quadrants 55a, 55b, 55c, 55d of primary color, the greater degree of primary color is present in the hue of color. This is described with greater detail with reference to FIG. 2.

In some embodiments, the amount of selectable light function settings 51 illustrating the range of colors and color may be equal to 10, 15, 20, 30, 40, 50, 60, 70, 80, 90, 100, 150, 200, 250 and 1000, and any range of light function settings, in which one of the aforementioned examples provides a lower limit to the range and one of the aforementioned examples provides an upper limit to the range, as well as any value within those ranges.

FIG. 2 depicts how a touch type interface can select colors from the diamond shaped perimeter grid of selectable light color settings that is depicted in FIG. 1. Touch type interfaces employ touch screen including devices. A touch screen is a display screen that is also an input device. The screens are sensitive to pressure. One mechanism by which the user interacts with graphic user interface 25 of the mobile computing device 100 is through the touch screen by touching pictures, icons, words or any selectable image/feature that is displayed on the screen. The touchscreen may be provided by a resistive touchscreen, a surface acoustic wave touchscreen, a capacitive touchscreen or a combination thereof. Any screen that can display the graphic user interface 25 and receiving commands through touch gestures, e.g., finger touch or stylus touch, is suitable for use with the methods, systems and computer program products described herein.

FIGS. 1 and 2 illustrates how a user may select by touch gestures, i.e., finger touch, may select selectable light color settings 51 from the primary color quadrants 55a, 55b, 55c, 55d, and from the color mixed, i.e., color hue, quadrants 56ab, 56bc, 56cd, 56ad. A user can select primary colors, i.e., yellow, green, blue and red, by touch selection at the quadrants 55a, 55b, 55c, 55d at the apexes of the diamond shaped perimeter 50. In some embodiments, a user can select color hues of primary color combinations by selection of a mixed color quadrant 56ab, 56bc, 56cd, 56ad between the primary color quadrants. The closer the light selectable settings 51 to the bordering quadrants 55a, 55b, 55c, 55d of primary color, the greater degree of primary color is present in the hue of color.

For example, as a user selects selectable light color settings 51 along line L1-L2, the closer the selectable light color settings 51 get to the L2 end of the line L1-L2, the greater the green content of the green and yellow color hue. For example, as a user selects selectable light color settings 51 along line L1-L2, the closer the selectable light color settings 51 get to the L1 end of the line L1-L2, the greater the yellow content of the green and yellow color hue. For example, as a user selects selectable light color settings 51 along line L2-L3, the closer the selectable light color settings 51 get to the L2 end of the line L2-L3, the greater the green content of the green and blue color hue. For example, as a user selects selectable light color settings 51 along line L2,-L3, the closer the selectable light color settings 51 get to the L3 end of the line L2-L3, the greater the blue content of the green and blue color hue. For example, as a user selects selectable light color settings 51 along line L3-L4, the closer the selectable light color settings 51 get to the L3 end of the line L3-L4, the greater the blue content of the blue and red color hue. For example, as a user selects selectable light color settings 51 along line L3-L4, the closer the selectable light color settings 51 get to the L3 end of the line L3-L4, the greater the red content of the blue and red color hue. For example, as a user selects selectable light color settings 51 along line L1-L4, the closer the selectable light color settings 51 get to the L1 end of the line L1-L4, the greater the yellow content of the yellow and red color hue. For example, as a user selects selectable light color settings 51 along line L1-L4, the closer the selectable light color settings 51 get to the L4 end of the line L1-L4, the greater the red content of the yellow and red color hue.

Due to the linear sidewalls S1, S2, S3, S4 of the diamond shaped perimeter 50 for the color selection scheme, and the positioning of the color mixed, quadrants 56ab, 56bc, 56cd, 56ad within the linear sections of the diamond shaped perimeter 50, a user can make selections of color hue, and primary color selections, e.g., using a touch interface, i.e., fingertip contacts, gestures and/or swipes, along linear pathways, i.e., lines L1-L2, L2-L3, L3-L4, and L1-L4.

In some embodiments, because each of the quadrants includes selectable light color settings in substantially linear columns and rows (at least one of which in the direction of lines L1-L2, L3-L3, L3-L4 and L1-L4, the user can navigate different color settings by linear motions, which allows the user to more clearly choose different colors, e.g., the correct hue of color. The geometry of the present color selection scheme, i.e., diamond shaped perimeter of selectable light color settings, lends itself to smoother interactions and choices between coordinates, i.e., selectable color settings. The design can allow the user to select via touch interface with near perfect precision color settings, e.g., red, blue, green, yellow and color hues of the aforementioned primary colors, by touch interface landing precisely on the user selected color settings.

In addition to the selection of colors and color hues, the color/color temperature selection scheme that includes diamond shaped perimeter grid 50 of selectable light color settings 51 surrounding a selectable dimming setting 52 also provides for adjustments of color saturation. Saturation defines the brilliance and intensity of a color. When a color hue is "toned," both white and black (grey) are added to the color to reduce the color's saturation. Saturation can be numerically characterized. Saturation can be selected from the diamond shaped perimeter 50 of selectable light settings 51 when the diamond shaped perimeter 50 is activated for color adjustment of light being emitted by lamps, e.g., my selection of the color button 40a. For each of the quadrants 55a, 55b, 55c, 55d, 56ab, 56bc, 56cd, 56ad, saturation may be selected in increments of selectable light settings 51 in a direction from the outer edge E1 of the diamond shaped perimeter 50 to the inner edge E2 of the diamond shaped perimeter 50. This is illustrated in FIG. 2, in which the direction of increments of selectable light settings 51 for selecting color saturation is depicted by the line W1-W2, which is perpendicular to the line L1-L2 illustrating hue color selection across quadrants 55a, 56ab and 55b. In some embodiments, lower color saturation levels, e.g., saturation=1, are present closer to the inner edge E2 of the diamond shaped perimeter 50, while higher color saturation levels, e.g., saturation=100 are present closer to the outer edge E2 of the diamond shaped perimeter 50. It is noted that although FIG. 2 only depicts a line for a trench of light saturation in quadrant 56ab, the same trend for selecting saturation of color from the diamond shaped perimeter 50 of selectable light settings 51 applies to all of the aforementioned quadrants of selectable light settings 51 including, e.g., quadrants 55a, 55b, 55c, 55d, 56ab, 56bc, 56cd, 56ad.

Referring to FIG. 3, activation of the selectable color temperature button 40b provides that the light color/color temperature settings 51 of the diamond shaped perimeter grid 50 correlates to selecting light color temperatures to be emitted from the lamp being controlled by the color/color temperature selection scheme that includes diamond shaped perimeter grid 50. By activating the selectable color temperature button 40b, each of the selectable settings on the diamond shaped perimeter grid 50 become color temperature settings 51. In some embodiments, the lowest color temperature settings, e.g., ranging from 1000° K to 2000° K, may be present in the quadrant identified by reference number 57a, which is the quadrant in the upper apex A1 of the diamond shaped perimeter grid 50. In some embodiments, the highest color temperature settings, e.g., ranging from 5000° K to 7000° K, may be present in the quadrant identified by reference number 57c, which is the quadrant in the lower apex A2 of the diamond shaped perimeter grid A2. In some embodiments, the intermediate color temperature settings may be present in the quadrant identified by reference number 57b. As illustrated in FIG. 3, the color temperature settings increase incrementally along line L5-L6 in the direction from point L5 to L6.

Referring to FIGS. 1-3, the graphic user interface being depicting on the mobile device 100 further includes a selectable dimming setting 52 centrally positioned within the diamond shaped perimeter grid 50 of selectable light color/color temperature settings 51. In some embodiments, the selectable dimming setting 52 may be a dimming scale that includes a reading illustrating a degree of dimming, i.e., a degree by which the light being projected by the luminaires. In some embodiments, the selectable dimming setting 52 may be expressed as a percentage of dimming and/or intensity. The percentage of dimming and/or intensity for the selectable dimming setting 52 can be selected by touch gesture, i.e., fingertip contact and/or swipe, via a touch screen interface.

In some examples, dimming or light intensity may be measured using lux. In some embodiments, the dimming or light intensity scale can provide for adjusting lighting between 100 lux to 1000 lux. For example, lighting for office work may be comfortably done at a value between 250 lux to 500 lux. For greater intensity applications, such as work areas that involve drawing or other detail work, the intensity of the lighting may be provided by luminaires that are illuminated to a range within 750 lux to 1,000 lux. It is not necessary that the selectable light function settings specifically describe numerical lux ranges.

The touch screen is only one input device used in the mobile computing device for controlling lighting. As will be described in more detail below, a cursor can be traversed across the graphic user interface in response to movement of the mobile computing device 100 that is measured by a motion sensor, such as a gyro sensor within the mobile computing device 100, wherein the cursor controlled by the movement of the mobile computing device 100 is used to select the selectable light functions for characteristics of light to be projected by luminaires.

Figure 4:
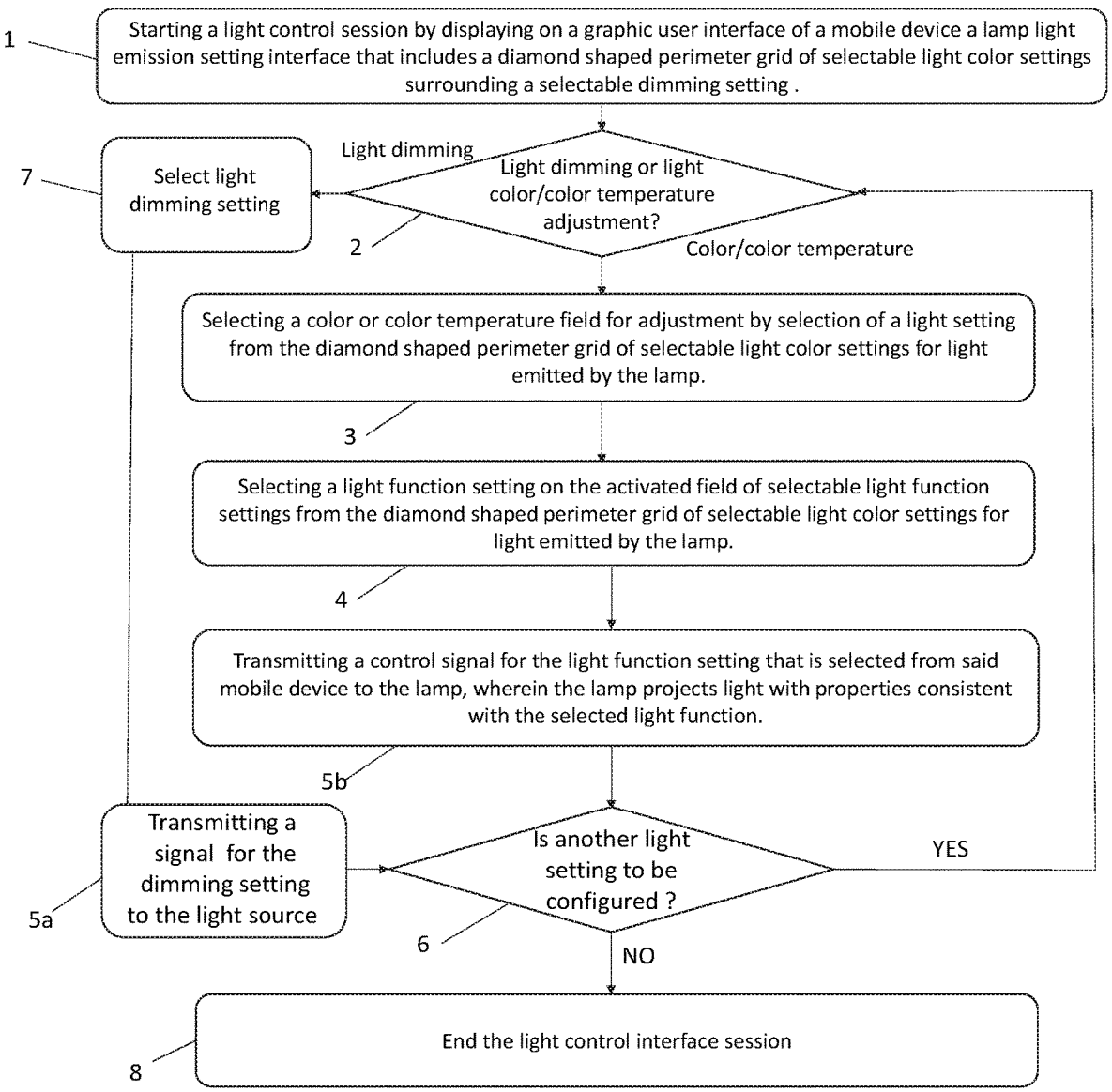
FIG. 4 is a flow diagram showing a method of controlling lighting of lamps using a graphic user interface having a diamond shaped perimeter grid of selectable light color settings surrounding a selectable dimming setting on the display of a mobile device, in accordance with one embodiment of the present disclosure.
Figure 5:
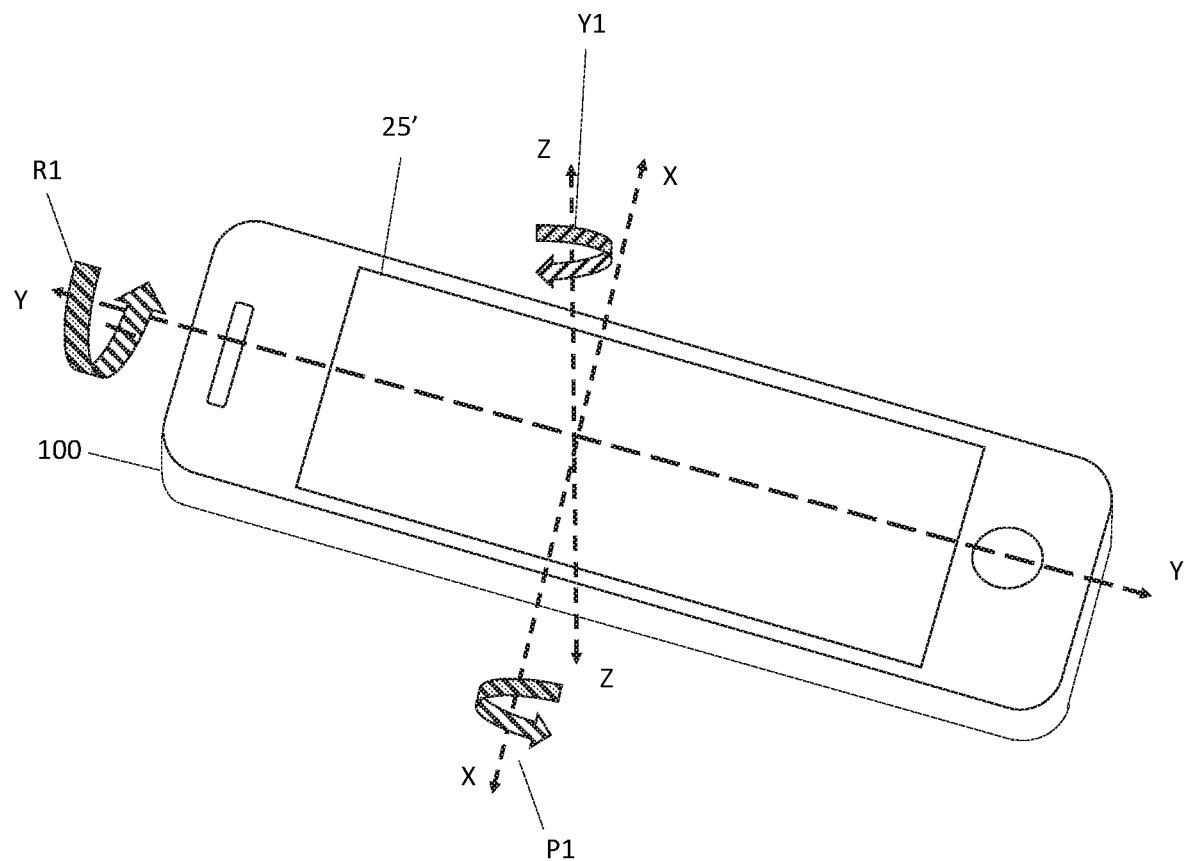
FIG. 5 is an illustration depicting a mobile computing device having referential axis in which movement of the mobile computing device about the referential axis can be measured by a motion sensor within the mobile computing device, wherein the motion of the mobile computing device measured by the motion sensor can be employed as a mechanism for controlling the motion of the cursor on the graphic user interface including the plurality of selectable light function settings, in accordance with one embodiment of the present disclosure.

FIG. 4 is a flow diagram showing a method of controlling lighting of lamps using a graphic user interface 25 having a diamond shaped perimeter grid 50 of selectable light color settings 51 surrounding a selectable dimming setting 52 on the display of a mobile device. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing functions/acts specified in the flowchart, and/or block diagram block or blocks. These computer readable program instructions may also be stored in a computer readable storage medium, which can be non-transitory, that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). A hardware processor may be employed to execute the one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to block 1 of FIG. 4, the method can begin with starting a light control interface by displaying on the graphic user interface 25 of a mobile computing device 100 a color selection scheme having a diamond shaped perimeter grid of selectable light color/color temperature settings 51 surrounding a selectable dimming setting 52, as depicted in FIGS. 1-3. the mobile computing device 100 can be a machine for computing calculations including a hardware processor that can be a hand held device. One example of mobile computing device 100 that is suitable for use with the light control methods, systems and computer program products that are described herein includes a phone having a touchscreen interface and an operating system capable of running applications, which can be referred to as a smart phone. In addition to cellular access, the smart phones can also have internet access. Another example of a mobile computing device 100 that is suitable for use with the methods, systems and computer program products described herein can be a tablet computer. In some examples, the tablet computer may be a computer contained in a touchscreen panel housing. The tablet computer may have at least one of internet or cellular access. In some embodiments, the mobile computing device 100 may be a dedicated light controller having a touch screen.

A touch screen is a display screen that is also an input device. The screens are sensitive to pressure. One mechanism by which the user interacts with graphic user interface 25 of the mobile computing device 100 is through the touch screen by touching pictures, icons, words or any selectable image/feature that is displayed on the screen. The touchscreen may be provided by a resistive touchscreen, a surface acoustic wave touchscreen, a capacitive touchscreen or a combination thereof. Any screen that can display the graphic user interface 25 and receiving commands through touch gestures, e.g., finger touch or stylus touch, is suitable for use with the methods, systems and computer program products described herein. As noted above, the touch screen is only one input device used in the mobile computing device for controlling lighting.

The graphical user interface (GUI) 25 is a type of user interface that allows users to interact with electronic devices, such as the mobile computing device 100 and luminaires, through graphical icons and visual indicators, such as secondary notation, instead of text-based user interfaces, typed command labels or text navigation. The graphic user interface 25 includes a diamond shaped perimeter grid 50 of selectable light color/color temperature settings 51 surrounding a selectable dimming setting 52, as illustrated in FIGS. 1-3.

In some embodiments, starting the light control session may include opening the application including the light control scheme on the mobile device 100. In some embodiments, when the light control scheme has been opening on the mobile device 100, before making light adjustment commands, the user can determine from the light control session if the lights are active, i.e., paired to the light control scheme and/or powered. For example, referring to FIGS. 1 and 3, the light control scheme may include a power button 39 on the graphic user interface 25. In some embodiments, when the lamps are active, the light control scheme on the graphic user interface 25 has control of the light being emitted from the lamps, and the power button 39 may be illuminated, e.g., illuminated in white light, or illuminated in a colored light, such as blue. When the lamps are not active, e.g., the lights are turned off, and/or the light control scheme does not have control of the lamps, the power button 39 is not illuminated, or the power button 39 is illuminated a different color than when it is when the light control scheme is active and/or the lamps are off. In some embodiments, in which the light control scheme is not active, the size of the power button 39 may increase.

In some embodiments, before the user begins to make changes to the light emitted by the lamps using the light control scheme, the user may select the scene, e.g., room, and light function forms, e.g., lamp type, to which the lighting controls may be applied. Referring to FIGS. 1 and 2, the graphic user interface 25 may include a scene icon 30 that indicates the selected scene to which the lighting controls are applied. In the example depicted in FIG. 2, the selected scene is the living room. Other scenes that can be selected may include other room types, such as bedrooms, bathrooms, kitchens, offices, hallways, garages, and other rooms, etc. The scene is not limited to room types. In some instances, the scene can be applied to larger scales, such as a floor or portion of a floor of a building. In other instance, the scene can be an entire building of a group of buildings within an office park.

In one embodiment, the scene may be selected using touch gestures on the graphic user interface 25. For example, the arrow icons 31 on opposing sides to the title "LIVING ROOM" can be employed to cycle through the different scene types that the user may select for the light controls to be applied to. The arrow icons 31 may be selected using the touch screen interface by user touch contact, and/or swipe contact.

Referring to FIGS. 1 and 3, in some embodiments, in addition to scene selections, the method can allow for light function form selections. A light function form can be a luminaire/lamp type that is within the scene for which the user would like to adjust the lighting. In the example depicted in FIGS. 1 and 3, the light function form is depicted in a light function form selection list 35 that includes icons 36*a* for selecting hanging pendant lamps, table lamps, chandeliers and a 2×2 and/or 2×4 tube lighting office type fixture. It is noted that these example light function forms are only some examples of the luminaires that can be controlled by the lighting methods described herein. In other examples, desk lamps, floor standing lamps, recessed can downlights, light sources with heat sinks, as well as any other type of light function form may be employed with the methods, systems and computer program products that are described herein. In some other embodiments, the icons 36*a* for the light function form may illustrate the type of bulb that is being employed in the luminaire/lamp, such as light emitting diode (LED) type bulbs, incandescent type bulbs, halogen type bulbs, fluorescent type bulbs, compact fluorescent type bulb and combinations thereof.

In some embodiments, one of the icons is a select all lighting icon 36*b*. Selection of the select all lighting icon 36*b* by the user applies all the lighting controls and adjustments for the luminaires being manipulated by the user through touch contact with the touch interface via the touch screen graphic user interface (GUI) for all of the lamps/luminaires that are within a scene. Other mechanisms for selecting scenes and light function forms may also be employed such as voice commands, as well as selection in response to eye motion sensed by the mobile computing device.

In some embodiments, after selecting the scene for the room of lamps to be controlled by the light control scheme and/or selecting the form function of the lamps to be controlled by the light control scheme, the method can continue with block 2 of FIG. 4.

Referring to FIG. 4, in some embodiments, from the light control scheme including the graphic user interface 25 including the diamond shaped perimeter grid 50 of selectable light color/color temperature settings 51 surrounding a selectable dimming setting 52, at block 2 the method may continue with the user deciding whether to adjust light being emitted from the lamps being controlled by the light control scheme for dimming or for color/color temperature adjustment.

To select adjustments for lamp dimming, the user activates the control for the selectable dimming setting 52 by touch contact with the touch interface via the touch screen graphic user interface (GUI) at block 7 of FIG. 4. In some embodiments, activation of the selectable dimming setting 42 from the graphic user interface 25 is followed with selection of a value for dimming or intensity of the light emitted by the lamps being controlled by the light control scheme. Selection of the selectable dimming setting 52 may be through touch contact with the selectable dimming setting 52 with the touch interface via the touch screen graphic user interface (GUI) 25. In some embodiments, selection of the selectable dimming setting 52 provides a sample light representation of the light adjusted with the selected dimming setting in a light setting preview icon 43. In some embodiments, a textual/numerical representation of the light adjustment may also be depicted on the graphic user interface 25. The textual/numerical representation may be identified by reference number 44.

Referring to block 3 of FIG. 4, to select adjustments for the color/color temperature of light being emitted by the lamps, the user may select either of the color button 40*a* or the color temperature button 40*b*. Selection of the color button 40*a* from the graphic user interface 25 provides a diamond shaped perimeter grid 50 of selectable light color settings 51 surrounding a selectable dimming setting 52, as depicted in FIGS. 1 and 2. Selection of the color temperature button 40*b* from the graphic user interface 25 provides a diamond shaped perimeter grid 50 of selectable light color temperature settings 51 surrounding a selectable dimming setting 52, as depicted in FIG. 3. Selection of the selectable color button 40*a* and/or the selectable color temperature button 40*b* may be through touch contact with the selectable dimming setting 52 with the touch interface via the touch screen graphic user interface (GUI) 25.

Referring to block 4 of FIG. 4, once the type of light setting, i.e., color type or color temperature, is selected for the diamond shaped perimeter grid 50 of selectable light color/color temperature settings 51, the method may continue with selecting a light function setting 51 on the activated field of selectable light function settings 51 from the diamond shaped perimeter grid 50 of selectable light color settings 51 for light emitted by the lamp. Selecting color settings when the selectable light function settings 51 have been set to correspond to color types has been described above with reference to FIGS. 1 and 2. In some embodiments, selection of the selectable light colors 51 provides a sample light representation of the light adjusted with the selected dimming setting in a light setting preview icon 43. In some embodiments, a textual/numerical representation of the light adjustment may also be depicted on the graphic user interface 25. The textual/numerical representation may be identified by reference number 44. Selecting color settings when the selectable light function settings 51 have been set to correspond to color temperatures has been described above with reference to FIG. 3. In some embodiments, selection of the selectable light color temperature 51 provides a sample light representation of the light adjusted with the selected dimming setting in a light setting preview icon 43. In some embodiments, a textual/numerical representation of the light adjustment may also be depicted on the graphic user interface 25. The textual/numerical representation may be identified by reference number 44. Selection of the selectable light function settings 51 correlating to light color and/or light color temperature may be through touch contact with the selectable dimming setting 52 with the touch interface via the touch screen graphic user interface (GUI) 25.

Blocks 5a and 5b of the method depicted in FIG. 4, includes a control signal for the light function setting that is selected from said mobile device to the lamp, wherein the lamp projects tight with properties consistent with the selected light function. In some embodiments, when the user has employed the light control scheme to adjust the light intensity/light dimming through the selectable dimming setting 52 with the touch interface via the touch screen graphic user interface (GUI) 25, the method may progress from block 7 to block 5a. At block 5a, a dimming control signal transmitted from the device running the light control scheme is transmitted and received by the lamp, in which the dimming control signal causes adjustments in the light being emitted from the lamp to either dim or increase the intensity of the light being emitted by lamp. In some embodiments, when the user has employed the light control scheme to adjust the light color/light color temperature through the diamond shaped perimeter grid 50 of selectable light color settings 51 with the touch interface via the touch screen graphic user interface (GUI) 25, the method may progress from block 4 to block 5b. At block 5b, a light color and/or light color temperature control signal transmitted from the device running the light control scheme is transmitted and received by the lamp, in which the light color and/or light color temperature control signal causes adjustments in the light being emitted from the lamp to adjust either the light color or light color temperature of the light being emitted by lamp.

Communication between the mobile computing device 100 and the lamps projecting the light is typically through a wireless connection, such as WiFi, Bluetooth, internet based connections, cellular connections and combinations thereof. In other embodiments, the communication between the mobile computing device 100 and the luminaires projecting the light may be through a wired connection, such as a local network connection, e.g., ethernet type connection. As described in further details below, both the mobile computing device 100 and the lamps may include communications modules providing for intercommunication between the devices.

Referring to FIG. 1, at step 6 of the method, the user may decide whether another light setting is to be configured. If further lighting adjustments are to be performed the method may repeat starting from step 2. If the user does not desire to perform further lighting adjustments, the user may end the light control interface session at step 8.

Referring to FIGS. 1-3, in some embodiments, following setting of the light projected by the lamp, the user has the option to save the selected light function so that the user can select the selected light characteristics at a later time. Saving the selected light functions can be achieved by the user selecting to save the setting in memory for the light control scheme by selecting the save settings in memory icon 41a that is present on the graphic user interface 25. The user can select the save setting in memory icon 41a through touch gesture pointing selection via the touch screen of the mobile computing device 100 on which the graphic user interface 25 is being displayed. The light setting may be saved in a form of memory, e.g., non-transitory memory, that can be present in the mobile computing device 100, or in a form of memory, e.g., non-transitory memory, that is housed in at least one of the lamp to which the lighting controls are being applied. In yet other examples, the light settings can be saved in a cloud based memory or in memory accessible through a local network that is in communication with at least one of the mobile computing device 100. In some embodiments, the color characteristics of the saved setting may be displayed in the favorites region of the graphic user interface 25 by a color coordinated icon 41b, i.e., the color coordinated icon 41b displays the color for the saved setting that can be selected by selecting the color coordinated icon 41b. The color coordinated icon 41b may be selected by touch contact with the color coordinated icon 41b with the touch interface via the touch screen graphic user interface (GUI) 25. Although FIGS. 1 and 3 depict four saved light settings corresponding to the four color coordinated icons 41b, the present disclosure is not limited to this number of saved light settings.

It is noted that the screen shots for the graphic user interface 25 and the methods that have been described above with reference to FIGS. 1-4 are not limited to being actuated via touch type contact and gestures through touch screen interfaces. For example, at least one of the diamond shaped perimeter grid 50 of selectable light color/color temperature settings 51 and the selectable dimming setting 52 may be actuated by a cursor that is traversed about the graphic user interface 25 in response to movements of the mobile device 100 on which the color selection schemes are being run. More specifically, in response to the movement of the mobile device 100, a cursor displayed on the device display is traversed over the graphic user interface, and when the user is present over the diamond shaped perimeter grid 50 of selectable light color/color temperature settings 51 and the selectable dimming setting 52, the color selection scheme may send a signal to the lamps to emit light having the selected characteristics.

Movement is responsive to movement of the mobile computing device 100, and the movement of the mobile computing device 100 is sensed by a motion sensor that is present within the mobile computing device 100, in which the movement sensed by the motion sensor is translated into motion of the cursor on the graphic under interface 25, i.e., motion of the cursor over the diamond shaped perimeter grid 50 of selectable light color/color temperature settings 51 and the selectable dimming setting 52.

For example, the cursor may respond to the rotational movement of the mobile computing device 100 to select at least one of selectable light color/color temperature settings 51 and the selectable dimming setting 52. For example, when the mobile computing device is rotationally tilted about the Y-Y axis depicted in FIG. 5, the cursor may correspondingly move left or right on the graphic user interface 25, and when the mobile computing device is rotationally tilted about the X-X axis depicted in FIG. 5, the cursor may correspondingly move up or down on the graphic user interface 25. In one embodiment, once the cursor is overlying the at least one of selectable light color/color temperature settings 51 and the selectable dimming setting 52, a second gesture, such as a movement of the mobile computer device up or down along the direction Z-Z depicted in FIG. 5 may provide a confirmation/selection function.

Transmitting a control signal for the selectable light color/color temperature settings 51 and the selectable dimming setting 52 that is selected from the mobile computing device 100 to the lamp, wherein the lamp projects light with properties consistent with the diamond shaped perimeter grid 50 of selectable light color/color temperature settings 51 and the selectable dimming setting 52 simultaneously with the cursor being present on the selectable light color/color temperature settings 51 and the selectable dimming setting 52 that is selected. For example, when the cursor is present overlying, or stop stopped over, a selectable light function setting, the luminaire in communication with the mobile computing device 100 running the lighting application projects light having characteristics consistent with the selected light function setting that is selected by the cursor. The projection of light by the luminaire having the characteristics of the selected light function setting is simultaneous with the selection of the selected light function setting from the grid of light functions, e.g., the color wheel 10a, the dimming scale 10b or the color temperature scale 10c, that is selected by the cursor 20a, 20b, 20c through the mobile device movement 100.

The motion sensor that senses the motion of the mobile computing device 100 may be at least one of a gyroscopic sensor (also referred to as gyro sensor), accelerometer, gravitational sensors and combinations thereof. In some embodiments, the motion sensors may be formed using Microelectromechanical Systems (MEMS), bonded gage and/or piezoelectric ceramic/film technologies. Gyroscopic sensors are sensors that are configured to measure the rotation of a mobile computing device 100. An accelerometer is a sensor that is configured to acceleration applied to the mobile computing device 100. Gravitational sensors are sensors configured to measure gravitational forces acting upon the mobile computing device 100.

Figure 6:
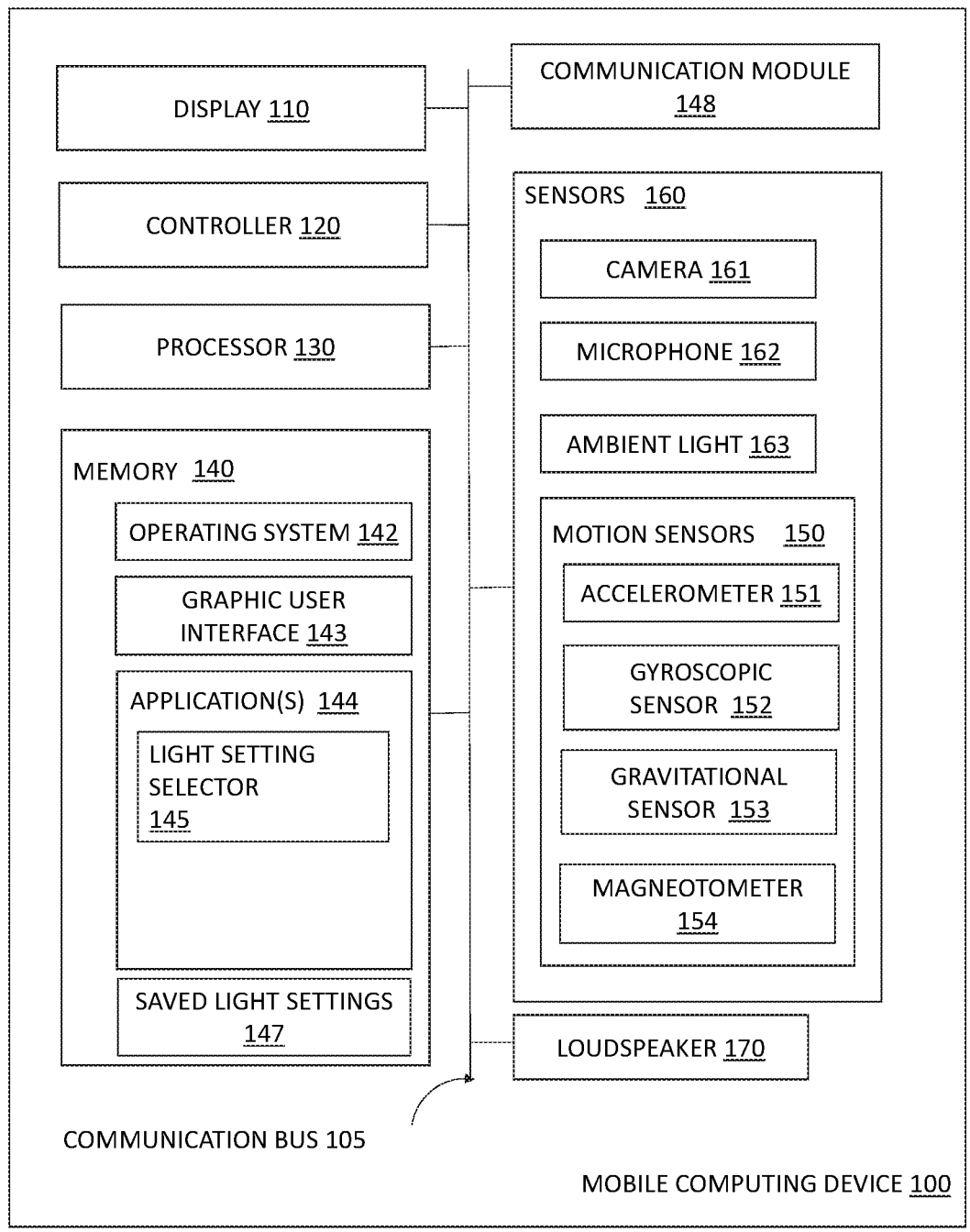
FIG. 6 is an illustration depicting a screen shot of a graphic user interface on a mobile device depicting icons for activating luminaires having saved light settings for the light that they project, in accordance with one embodiment of the present disclosure.

FIG. 6 depicts one embodiment of a controller, e.g., mobile device computing device 100, is provided for adjusting light characteristics to be projected from a lamp. The controller 100 may include a graphic user interface 25 that is displayed on a device screen (display screen 110). The controller 100 can also include a communication module 148 that provides that the controller 100 is in communication with at least one lamp. The controller 100 may include a light setting selector 145 that provides a lamp light emission setting interface that includes a diamond shaped perimeter grid 50 of selectable light color/color temperature settings 51 surrounding a selectable dimming setting 52 for display on the device screen (display 110), wherein activation of one of the selectable light color/color temperature settings 51 or the selectable dimming setting 52 by a selector of the graphic use interface 25 by a user of the controller sends a signal via the communication module 148 to the at least one lamp to emit light having characteristics that are consistent with the selectable light color/color temperature setting 51 that has been selected by the user, as described with reference to FIGS. 1-5.

The mobile computing device 100 may also include a processor 130 coupled to memory 140, the processor 130 configured to display using the light setting selector 145 and the lamp light emission setting interface that includes a diamond shaped perimeter grid 50 of selectable light color/color temperature settings 51 surrounding a selectable dimming setting 52 on the graphic user interface 25. The adjustment of light emissions from lamps controlled by the mobile computing device 100, e.g., controller, by selection of the selectable light color/color temperature settings 51 and/or the selectable dimming setting 52 has been described with reference to FIGS. 1-5. Referring to FIG. 6, the mobile computing device 100, i.e., controller, also includes a communications module 148 configured to transmit a signal to a lamp providing instruction that the lamp display/project light having the characteristics of the selected light function setting.

The mobile computing device 100 can be any of a wide range of computing platforms. In some embodiments, the mobile computing device 100 can be a laptop/notebook computer or sub-notebook computer; a tablet or phablet computer; a mobile phone or smartphone; a personal digital assistant (PDA); a portable media player (PMP); a cellular handset; a handheld gaming device; a gaming platform; a wearable or otherwise body-borne computing device, such as a smartwatch, smart glasses, or smart headgear; and/or a combination of any one or more thereof.

The mobile computing device 100 may include a display 110. The display 110 can be any electronic visual display or other device configured to display or otherwise generate an image (e.g., image, video, text, and/or other displayable content) therefrom. In some embodiments, the display 110 is a touchscreen display or other touch-sensitive display that can utilize any of a wide range of touch-sensing techniques, such as, for example: resistive touch-sensing; capacitive touch-sensing; surface acoustic wave (SAW) touch-sensing; infrared (IR) touch-sensing; optical imaging touch-sensing; and/or a combination of any one or more thereof. The touch screen display 110 may be configured to detect or otherwise sense direct and/or proximate contact from a user's finger, stylus, or other suitable implement (which can be collectively referred to as a touch gesture) at a given location of that display 110. The touch screen display 110 may be configured to translate such contact into an electronic signal that can be processed by mobile computing device 100 (e.g., by the one or more processors 130 thereof) and manipulated or otherwise used to trigger a given GUI action. In some cases, a touch-sensitive display 110 may facilitate user interaction with computing device 100 via the graphic user interface 25 presented by such display 110. Further details regarding the graphic user interface 25 that is depicted on the display 110 have been provided in the above description of FIGS. 1-5, in which the graphic user interface 25 includes a diamond shaped perimeter grid 50 of selectable light color/color temperature settings 51 surrounding a selectable dimming setting 52 on the graphic user interface 25. Further details regarding the graphic user interface 25, and the diamond shaped perimeter grid 50 of selectable light color/color temperature settings 51 surrounding the selectable dimming setting 52 that is present on the graphic user interface 25, are provided in the above description of FIGS. 1-3, and blocks 4 and 7 of FIG. 4.

In accordance with some embodiments, the computing device 100 may include or otherwise be communicatively coupled with one or more controllers 120, as depicted in FIG. 6. A given controller 120 may be configured to output one or more control signals to control any one or more of the various components/modules of computing device 100 and may do so, for example, based on wired and/or wireless input received from a given local source (e.g., such as on-board memory 140) and/or remote source (e.g., such as a control interface, optional server/network 400, etc.). In accordance with some embodiments, a given controller 120 may host one or more control modules and can be programmed or otherwise configured to output one or more control signals, for example, to adjust the operation of a given portion of computing device 100.

The computing device 100 may include memory 140 and one or more processors 130. Memory 140 can be of any suitable type (e.g., RAM and/or ROM, or other suitable memory) and size, and in some cases may be implemented with volatile memory, non-volatile memory, or a combination thereof. A given processor 130 of computing device 100 may be configured as typically done, and in some embodiments may be configured, for example, to perform operations associated with computing device 100 and one or more of the modules thereof (e.g., within memory 140 or elsewhere). In some cases, memory 140 may be configured to be utilized, for example, for processor workspace (e.g., for one or more processors 130) and/or to store media, programs, applications, and/or content on computing device 100 on a temporary or permanent basis.

The one or more modules stored in memory 140 can be accessed and executed, for example, by the one or more processors 130 of computing device 100. In accordance with some embodiments, a given module of memory 140 can be implemented in any suitable standard and/or custom/proprietary programming language, such as, for example C, C++, objective C, JavaScript, and/or any other suitable custom or proprietary instruction sets, as will be apparent in light of this disclosure. The modules of memory 140 can be encoded, for example, on a machine-readable medium that, when executed by one or more processors 130, carries out the functionality of computing device 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 140 (e.g., such as operating system (OS) 142, graphic user interface (GUI) 143, and/or one or more applications 144, each discussed below) can be implemented in hardware, software, and/or firmware, as desired for a given target application or end-use. The memory 140 may include an operating system (OS) 142. The OS 142 can be implemented with any suitable OS, mobile or otherwise, such as, for example, Android OS from Google, Inc.; iOS from Apple, Inc.; BlackBerry OS from BlackBerry Ltd.; Windows Phone OS from Microsoft Corp; Palm OS/Garnet OS from Palm, Inc.; an open source OS, such as Symbian OS; and/or a combination of any one or more thereof. As will be appreciated in light of this disclosure, OS 142 may be configured, for example, to aid with the lighting controls that employ the motions of a mobile computing device 100 to select light characteristics to be projected by luminaires.

The memory 140 may also include at least one module for saved light settings 147. The saved light settings 147 include the lighting parameters that a user may have saved for a light function form, e.g., lamp type, or scene, e.g., room type. Further details on the saved light settings 147 are provided in the description of the screen shots depicted in FIGS. 1 and 3 including the icons identified by reference numbers 41*a*, 41*b* and 44.

In accordance with some embodiments, mobile computing device 100 may include a graphic user interface (GUI) module 143 that corresponds with the graphic user interface 25 described with reference to FIGS. 1-5.

The memory 140 may have stored therein (or otherwise have access to) one or more applications 144. In some instances, mobile computing device 100 may be configured to receive input, for example, via one or more applications 144 stored in memory 140, such as a light setting selector 145 that provides a lamp light emission setting interface that includes a diamond shaped perimeter grid 50 of selectable light color/color temperature settings 51 surrounding a selectable dimming setting 52 for display on the device screen (display 110). Activation of one of the selectable light color/color temperature settings 51 or the selectable dimming setting 52 by a selector, i.e, touch or gesture selection, via the graphic use interface 25 by a user of the controller 100 sends a signal via the communication module 148 to the at least one lamp to emit light having characteristics that are consistent with the selectable light color/color temperature setting 51 that has been selected by the user, as described with reference to FIGS. 1-5.

In some embodiments, mobile computing device 100 may include a communication module 148. The communication module 148 can be configured to transmit a signal to a luminaire providing instruction that the luminaire display the selected light function setting that was selected in accordance with the light setting selector 145. The communication module 148 may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In some embodiments, the communication module 148 may be configured for communication by cellular signal used in cellular phones, and cellular type devices. In some embodiments, communication module 148 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 148, as desired for a given target application or end-use. In some instances, communication module 148 may be configured to communicate with one or more luminaires 200. In some cases, communication module 148 of computing device 100 and communication module 250 of a given lamp 200 (as further described in FIG. 7) may be configured to utilize the same communication protocol. In some cases, communication module 148 may be configured to communicate with a server/network 400 (as further described in FIG. 8). Further details regarding the function of the communication module 148 are provided in the description of block 5 of the method described in FIG. 4.

In accordance with some embodiments, mobile computing device 100 may include one or more sensors 160. As noted above, in some instances, instead of employing a touch interface or in combination with the touch interface, the motion of the mobile device 100 may be employed to move a cursor on the graphic user interface 25 for selecting light settings, i.e., selectable light color/color temperature settings 51 and/or dimming settings 52. The motion sensors 150 of the sensors 160 housed within the mobile computing device 100, such as at least one accelerometer 151, gravitational sensor 153, gyroscopic sensor 152, and/or magnetometer 154, may be used to detect movement of mobile computing device 100 to control the aforementioned cursor on the graphic user interface 25.

In some embodiments, a given mobile computing device 100 may include other sensors 160 in addition the aforementioned motion sensors, which can include at least one camera 161 (or image capture device), microphone 163 (or sound capture device), ambient light sensor 165, and/or any other suitable sensor to, for example, implement the techniques variously described herein. In some embodiments, the camera 161 may be employed in eye contact commands, such as with iris scanners, in which the eye contact command can provide a confirmation gesture for setting the light projected by the lamp that is consistent with the light setting that is selected, as described in FIGS. 1-3, and blocks 4 and 7 of the method depicted in FIG. 4. In some embodiments, the microphone 163 may be employed in voice commands, in which the voice command can provide a confirmation command for setting the light projected by the lamp that is consistent with the light setting that is selected, as described in FIGS. 1-3, and blocks 4 and 7 of the method depicted in FIG. 4.

The sensor(s) 160 of a given mobile computing device 100 may include componentry as desired for a given target application or end-use. Also, it should be noted that the present disclosure is not so limited only to the example sensors 160 shown, as additional and/or different sensors 160 may be provided, as desired for a given target application or end-use, in accordance with some other embodiments.

In accordance with some embodiments, mobile computing device 100 (also referred to as controller) may include one or more loudspeakers 170 or other audio output devices, in accordance with some embodiments. Loudspeaker(s) 170 can be, for example, a speaker or any other device capable of producing sound from an audio data signal, in accordance with some embodiments. In some embodiments, the loudspeaker(s) can emit a tone as an affirmation single that the mobile computing device 100 has received a signal to set the light being projected from the lamp consistent with the light setting that is selected, as described in FIGS. 1-3, and blocks 4 and 7 of the method depicted in FIG. 4. In some instances, audio output device 170 may be integrated, in part or in whole, with mobile computing device 100, whereas in some other instances, audio output device 170 may be a standalone component configured to communicate with mobile computing device 100 using any suitable wired and/or wireless communications means, as desired.

As illustrated in FIG. 6, the aforementioned elements of the mobile computing device 100 may be interconnected with a communications bus 105.

Figure 7:
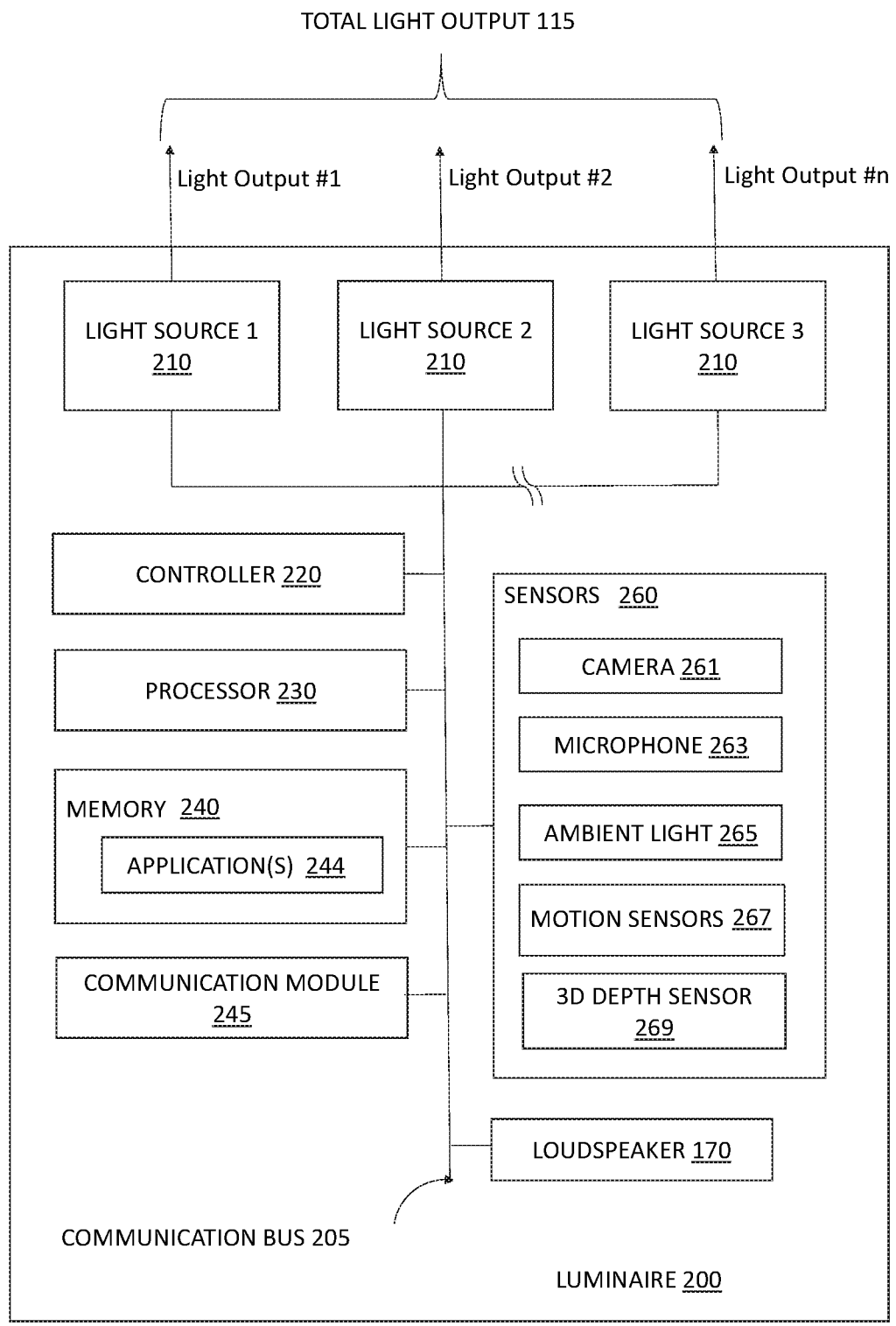
FIG. 7 is an illustration (block diagram) an exemplary mobile device system for controlling lighting using a mobile computing device having a motion sensor that is present therein, in accordance with an embodiment of the present disclosure.
Figure 8:
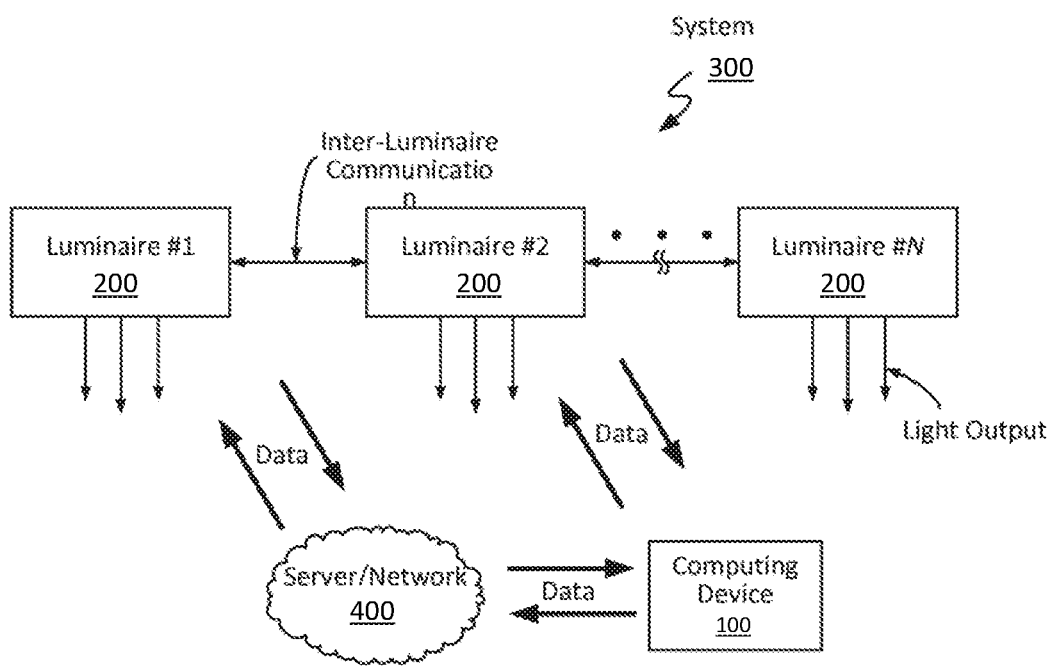
FIG. 8 is an illustration (block diagram) of an exemplary luminaire system that can work in communication with the mobile device system for controlling lighting, in accordance with one embodiment of the present disclosure.

FIG. 7 is a block diagram depicting an exemplary lamp (also referred to as luminaire) 200 that can work in communication with the mobile computing device 100, i.e., controller, for controlling lighting. As can be seen, lamp 200 may include one or more light sources 210 that each provide corresponding light output. The number n of light sources 210 for a given luminaire 200 can be customized as desired for a given target application or end-use. The light sources 210 and componentry of lamp 200 will be described in more detail herein. However, note that lamp 200 may include additional or alternative componentry based on the specific configuration used. For example, in the case of lamp 200 including solid-state light sources 210, lamp 200 may include componentry, such as at least one driver, modulator, digital to analog (DAC) converter (not shown), just to name some additional example componentry. Also note that although the componentry (e.g., controller 220, processor 230, etc.) is shown as being within the box representing luminaire 200, such componentry need not be physically located within the housing of luminaire 200. In some embodiments, some or all (or alternative) componentry shown in FIG. 7 may generally be a part of lighting system 300 as shown in FIG. 8 and may be used to control multiple luminaires 200 (e.g., control multiple luminaires 200 simultaneously). In some embodiments, luminaire 200 may include one or more solid-state light sources 210. A given solid-state light source may include one or more solid-state emitters, which may be any of a wide range of semiconductor light source devices, such as, for example: a light-emitting diode (LED); (2) an organic light-emitting diode (OLED); (3) a polymer light-emitting diode (PLED); and/or (4) a combination of any one or more thereof. In some embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some embodiments, luminaire 200 may include other light sources 210 in addition to or in the alternative of solid-state light sources 210, such as incandescent or fluorescent lighting, for example. The quantity and arrangement of lighting sources 210 utilized for each luminaire may be customized as desired for a given target application or end-use.

The lamp 200 may include at least one controller 220, at least one processor 230, and/or memory 240. Controller(s) 220 may be configured to be operatively coupled (e.g., via a communication bus or other suitable interconnect) with light sources 210 or corresponding componentry, such as the light source drivers (not shown), to control the light output provided therefrom. Note that the light output from each light source 210 creates a total light output 215, in this example embodiment. In some embodiments, luminaire 200 may include a centralized controller 220 and/or processor 230 configured to control the total light output 215 of the entire system. In some such embodiments, the control of the light output may be wired and/or wireless, depending upon the given configuration. In some embodiments, light sources 210 of luminaire may be individually controlled. The controller 220 is in communication with the communication bus 205, hence receives signals from the mobile computing device 100 through the communications module 250. The signals received from the mobile computing device 100 can include information on selected light emission adjustments, which can include light color, light intensity/dimming and light color temperature, that was selected by the user for the type of light to be projected by the lamp 200 consistent with the light setting that is selected, as described in FIGS. 1-3, and blocks 4 and 7 of the method depicted in FIG. 4. The controller 220 can control the light output to meet the requirements of the selected light function adjustment signaled from the mobile computing device 100.

The memory 240 used by the lamp 200 can be of any suitable type (e.g., RAM and/or ROM, or other suitable memory) and size, and in some cases may be implemented with volatile memory, non-volatile memory, or a combination thereof. A given processor 230 may be configured as typically done, and in some embodiments may be configured, for example, to perform operations associated with lamp 200 or a given light source 210 and one or more of the modules thereof (e.g., within memory 240 or elsewhere). In some cases, memory 240 may be configured to be utilized, for example, for processor workspace (e.g., for one or more processors 230) and/or to store media, programs, applications 244, and/or content for lamp 200 or system on a temporary or permanent basis.

The one or more modules stored in memory 240 can be accessed and executed, for example, by the one or more processors 230 of the lamp 200. In accordance with some embodiments, a given module of memory 240 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 240 can be encoded, for example, on a machine-readable medium that, when executed by a processor 230, carries out the functionality of the lamp 200 or system, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 240 (e.g., one or more applications 242, discussed below) can be implemented in hardware, software, and/or firmware, as desired for a given target application or end-use.

In accordance with some embodiments, the memory 240 of the lamp 200 may have stored therein (or otherwise have access to) one or more applications 242. In some instances, a given lamp 200 may be configured to receive input, for example, via one or more applications 242 stored in memory 240. For instance, an example application 242 may allow a user to program or configure a lamp 200 to project light having characteristics, such as the light color, light intensity/dimming, or light temperature color, that substantially match a selected light function setting that is selected from a graphic user interface 25 consistent with the light setting that is selected, as described in FIGS. 1-3, and blocks 4 and 7 of the method depicted in FIG. 4.

In some embodiments, a given lamp 200 may include a communication module 250, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 250 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 250, as desired for a given target application or end-use. In some instances, communication module 250 may be configured to facilitate inter-system communication between lamps 200 and/or communication between luminaire(s) 200 and the mobile computing device 100.

In accordance with some embodiments, a given lamp 200 may include one or more optional sensors 260. In some embodiments, a given lamp 200 may optionally include at least one camera 261 (or image capture device), microphone 263 (or sound capture device), ambient light sensor 265, motion sensor 267, 3-dimensional (3D) depth sensor 269, and/or any other suitable sensor to, for example, implement the techniques variously described herein. When included, sensor(s) 260 may be configured as typically done. In another example, microphone 263 may be configured to detect voice commands used to control the lamp 200. In any case, the sensor(s) 260 of a given lamp 200 may include componentry as desired for a given target application or end-use. Also, it should be noted that the present disclosure is not so limited only to the example optional sensors 260 shown, as additional and/or different sensors 260 may be provided, as desired for a given target application or end-use, in accordance with some other embodiments.

In accordance with some embodiments, a given lamp 200 may include one or more loudspeakers 270 or other audio output devices. Loudspeaker(s) 270 can be, for example, a speaker or any other device capable of producing sound from an audio data signal, in accordance with some embodiments. Loudspeaker(s) 270 may be programmed using any suitable techniques and they may be configured to output audio related to the lighting control techniques variously described herein. For example, controller 220 and/or processor 230 may be configured to control audio output of the loudspeaker(s) 270 to provide audio feedback as to whether an attempted command has been recognized or provide audio feedback relating to the specific command detected or the resulting change in light output (e.g., dimming lights by 10%, changing light color to red, etc.). Numerous configurations and variations on luminaire(s) 200 will be apparent in light of this disclosure.

FIG. 8 illustrates an example lighting system 300, in accordance with an embodiment of the present disclosure. As can be seen, lighting system 300 includes multiple lamps 200 and a mobile computing device 100. Lamps 200 and the mobile computing device 100 may be configured to be communicatively coupled using, for example, server/network 400. Although lighting system 300 is shown in FIG. 8 as having any number N of lamps 200, system 300 may include only a lamp 200 or multiple lamps 200 each of which are configured to output light. Lamps 200 are shown having inter-luminaire communication capabilities in example lighting system 300, which may be provided via any suitable wired and/or wireless techniques to, for example, allow a lamp 200 to transmit and/or receive data from one or more other lamps 200, such as data related to the lighting control methods, systems and computer program products as variously described herein with reference to FIGS. 1-8. In some embodiments, lamps 200 may be communicatively coupled using, for example, server/network 400. However, lamps 200 need not have such inter-luminaire communication capabilities.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method, system and computer program product for controlling lighting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of controlling lighting comprising:
   pairing a lamp with a device with a touch screen including a graphic user interface having a diamond shaped grid of selectable light color settings, the diamond shaped grid having a diamond geometry outer perimeter and a substantially matching diamond geometry inner perimeter, the diamond geometry inner perimeter entirely surrounding a selectable dimming setting, the selectable light color settings positioned between the diamond geometry inner perimeter and the diamond geometry outer perimeter including light colors, the diamond shaped perimeter grid of said selectable light color settings including primary color quadrants for yellow, green, blue and red, wherein a primary color quadrant is present at each of the four apexes of the diamond shaped perimeter grid, wherein between each pair of primary color quadrants is an intermixed color quadrant, the intermixed color quadrant having hues of colors mixed from primary colors of bordering primary color quadrants, wherein increments of the hues of color are positioned in a plurality of columns in which each column of the plurality of columns has a substantially same width at an abutting adjacent column of the plurality of columns, and positioning of the hues of color is gradual in linear directions between the primary color quadrants, the hues of color that are gradual in linear directions between the primary color quadrants provides for precise selection of the selectable light color settings using a touch interface with the graphic user interface; and
   selecting through the touch screen a selectable light color setting from the graphic user interface, wherein the device including the graphic user interface transmits a signal to the lamp to emit light having a color that is consistent with the selectable light color setting that has been selected.

2. The method of claim 1, wherein the selectable light color settings can be arranged in increasing saturation from an inner edge of the diamond shaped perimeter grid to an outer edge of the diamond shaped perimeter grid.

3. The method of claim 1, wherein the diamond shaped perimeter grid of selectable light color settings includes light color temperature settings.

4. The method of claim 3, wherein the light color temperature settings on the diamond shaped perimeter grid of selectable light color settings increase in light color numerical value from a first apex at an upper portion of the diamond shaped perimeter grid to a second apex at a lower portion of the diamond shaped perimeter grid.

5. The method of claim 1, wherein the graphic user interface includes a light color selectable icon for activating the selectable light color setting to correlate to light colors, and the graphic user interface includes a light color selectable icon for activating the selectable light color temperature settings to correlate to light color temperatures.

6. The method of claim 1, wherein the lamp includes a light emitting diode (LED) light source.

7. A controller for selecting colors to be projected from a lamp comprising:
   a graphic user interface that is displayed on a device screen that is a touch screen;
   a communication module that provides that the controller is in communication with at least one lamp; and
   a light setting selector including a processor that provides a lamp light emission setting interface that includes a diamond shaped grid of selectable light color settings, the diamond shaped grid having a diamond geometry outer perimeter and a substantially matching diamond geometry inner perimeter, the diamond geometry inner perimeter entirely surrounding a selectable dimming setting, the selectable light color settings positioned between the diamond geometry inner perimeter and the diamond geometry outer perimeter including light colors, the diamond shaped perimeter grid of said selectable light color settings including primary color quadrants for yellow, green, blue and red, wherein a primary color quadrant is present at each of the four apexes of the diamond shaped perimeter grid, wherein between each pair of primary color quadrants is an intermixed color quadrant, the intermixed color quadrant having hues of colors mixed from primary colors of bordering primary color quadrants, wherein increments of the hues of color are gradual in linear directions between the primary color quadrants, the hues of color are positioned in a plurality of columns in which each column of the plurality of columns has a substantially same width at an abutting adjacent column of the plurality of columns, and positioning of the hues of color is gradual in linear directions between the primary color quadrants provides for precise selection of the selectable light color settings using a touch interface with the graphic user interface, wherein activation of one of the selectable light color settings or the selectable dimming setting from the touch screen of a graphic user interface by a user of the controller sends a signal via the communication module to the at least one lamp to emit light having a color that is consistent with the selectable light color setting that has been selected by the user.

8. The controller of claim 7, wherein the selectable light color settings can be arranged in increasing saturation from an inner edge of the diamond shaped perimeter grid to an outer edge of the diamond shaped perimeter grid.

9. The controller of claim 7, wherein the diamond shaped perimeter grid of selectable light color settings includes light color temperature settings.

10. The controller of claim 9, wherein the light color temperature settings on the diamond shaped perimeter grid of selectable light color settings increase in light color numerical value from a first apex at an upper portion of the diamond shaped perimeter grid to a second apex at a lower portion of the diamond shaped perimeter grid.

11. The controller of claim 9, wherein the lamp includes a light emitting diode (LED) light source.

12. A non-transitory computer readable storage medium including contents that are configured to cause a computer to perform a method for controlling lighting, the method comprising:

pairing a lamp with a graphic user interface on a device having a touch screen, the graphic user interface having a diamond shaped grid of selectable light color settings, the diamond shaped grid having a diamond geometry outer perimeter and a substantially matching diamond geometry inner perimeter, the diamond geometry inner perimeter entirely surrounding a selectable dimming setting, the selectable light color settings positioned between the diamond geometry inner perimeter and the diamond geometry outer perimeter including light colors, the diamond shaped perimeter grid of said selectable light color settings including primary color quadrants for yellow, green, blue and red, wherein a primary color quadrant is present at each of the four apexes of the diamond shaped perimeter grid, wherein between each pair of primary color quadrants is an intermixed color quadrant, the intermixed color quadrant having hues of colors mixed from primary colors of bordering primary color quadrants, wherein increments of the hues of color are positioned in a plurality of columns in which each column of the plurality of columns has a substantially same width at an abutting adjacent column of the plurality of columns, and positioning of the hues of color is gradual in linear directions between the primary color quadrants, the hues of color that are gradual in linear directions between the primary color quadrants provides for precise selection of the selectable light color settings using a touch interface with the graphic user interface;

selecting using the touch screen from the graphic user interface a light adjustment from one of a selectable light color setting and the selectable dimming setting from the graphic user interface; and transmitting from the device including the graphic user interface transmits a signal to the lamp to emit light having characteristics consistent with the light adjustment.

* * * * *